US007240356B2

(12) United States Patent
Iki et al.

(10) Patent No.: US 7,240,356 B2
(45) Date of Patent: *Jul. 3, 2007

(54) METHOD AND APPARATUS FOR DISPLAYING DIFFERENCES IN THE CHARACTERISTICS OF MULTIPLE VERSIONS OF AN ENTERTAINMENT PROGRAM

(75) Inventors: Jean M. Goldschmidt Iki, San Jose, CA (US); Anthony A. Shah-Nazaroff, Santa Clara, CA (US); Christopher D. Williams, Soquel, CA (US); Gregory D. Buscheck, San Jose, CA (US); Kenneth Alan Moore, Ben Lomond, CA (US)

(73) Assignee: Intel Corporation, Santa Clara, CA (US)

( * ) Notice: Subject to any disclaimer, the term of this patent is extended or adjusted under 35 U.S.C. 154(b) by 1259 days.

This patent is subject to a terminal disclaimer.

(21) Appl. No.: 09/779,778

(22) Filed: Feb. 8, 2001

(65) Prior Publication Data

US 2001/0005903 A1 Jun. 28, 2001

Related U.S. Application Data

(62) Division of application No. 09/183,277, filed on Oct. 30, 1998.

(51) Int. Cl.
*H04N 5/445* (2006.01)

(52) U.S. Cl. .......................................... 725/48; 725/40

(58) Field of Classification Search .................. 725/48, 725/49, 50, 51, 47, 39, 40
See application file for complete search history.

(56) References Cited

U.S. PATENT DOCUMENTS

| 5,444,499 A | 8/1995 | Saitoh |
| 5,488,410 A | 1/1996 | Lieberfarb et al. |

(Continued)

FOREIGN PATENT DOCUMENTS

EP     0 872 970 A     10/1998

(Continued)

OTHER PUBLICATIONS

International Search Report, PCT/US99/25560, Feb. 23, 2000, 4 pages.

(Continued)

*Primary Examiner*—Christopher Grant
*Assistant Examiner*—Sumaiya A. Chowdhury
(74) *Attorney, Agent, or Firm*—Blakely, Sokoloff, Taylor & Zafman LLP

(57) ABSTRACT

A method and apparatus for displaying differences in the characteristics of multiple versions of an entertainment program includes receiving entertainment programming input, identifying multiple versions of an available entertainment program, identifying, for each of the multiple versions, a set of descriptive information regarding the respective version, the descriptive information comprising a plurality of characteristics of the respective version, identifying the differences in characteristics between the multiple versions displaying the differences in characteristics between the multiple versions to a user.

22 Claims, 5 Drawing Sheets

| SOURCE IDENTIFIER (402) | CHANNEL TRANSPORT MEDIUM (404) | CHANNEL AUDIO SUPPORT (406) | DATE (408) | START TIME (410) | PROGRAM DESCRIPTION (412) | PROGRAM CHARACTERISTIC (1) | ... | PROGRAM CHARACTERISTIC (n) (414) |
|---|---|---|---|---|---|---|---|---|
| 7 | ANALOG BROADCAST | STEREO | | | | | | |
| 401 | DIGITAL CABLE | DOLBY PRO LOGIC | | | | | | |
| DISK(1) | DVD | THX; DOLBY AC3 | | | | | | |
| ⋮ | | | | | | | | |

U.S. PATENT DOCUMENTS

| | | |
|---|---|---|
| 5,534,911 A | 7/1996 | Levitan |
| 5,550,576 A | 8/1996 | Klosterman ................. 348/906 |
| 5,559,949 A * | 9/1996 | Reimer et al. .............. 715/720 |
| 5,564,088 A | 10/1996 | Saitoh |
| 5,585,838 A | 12/1996 | Lawler et al. |
| 5,585,865 A | 12/1996 | Amano et al. |
| 5,594,492 A | 1/1997 | Lew |
| 5,596,373 A | 1/1997 | White et al. |
| 5,629,733 A | 5/1997 | Youman et al. ................ 348/13 |
| 5,657,072 A | 8/1997 | Aristides et al. |
| 5,666,645 A | 9/1997 | Thomas et al. |
| 5,684,525 A | 11/1997 | Klosterman |
| 5,684,918 A | 11/1997 | Abecassis |
| 5,686,954 A | 11/1997 | Yoshinobu et al. ........... 348/13 |
| 5,724,472 A | 3/1998 | Abecassis |
| 5,729,825 A | 3/1998 | Kostreski |
| 5,734,853 A | 3/1998 | Hendricks et al. |
| 5,751,282 A * | 5/1998 | Girard et al. ................ 715/721 |
| 5,798,785 A | 8/1998 | Hendricks et al. |
| 5,801,787 A | 9/1998 | Schein et al. |
| 5,900,915 A * | 5/1999 | Morrison ..................... 725/44 |
| 5,945,988 A | 8/1999 | Williams et al. |
| 5,977,964 A | 11/1999 | Williams et al. |
| 5,982,411 A | 11/1999 | Eyer et al. |
| 5,990,927 A | 11/1999 | Hendricks et al. |
| 6,003,041 A | 12/1999 | Wugofski |
| 6,005,565 A * | 12/1999 | Legall et al. ............... 715/721 |
| 6,008,802 A | 12/1999 | Iki et al. |
| 6,020,880 A | 2/2000 | Naimpally |
| 6,025,837 A | 2/2000 | Matthews, III et al. |
| 6,226,444 B1 | 5/2000 | Goldschmidt et al. |
| 6,075,526 A | 6/2000 | Rothmuller |
| 6,075,971 A | 6/2000 | Williams et al. |
| 6,157,377 A | 12/2000 | Shah-Nazaroff et al. |
| 6,157,411 A | 12/2000 | Williams et al. |
| 6,163,345 A | 12/2000 | Noguchi et al. |
| 6,173,112 B1 | 1/2001 | Gruse et al. |
| 6,184,918 B1 | 2/2001 | Goldschmidt et al. |
| 6,247,176 B1 | 6/2001 | Schein et al. |
| 6,295,646 B1 | 9/2001 | Goldschmidt et al. |
| 6,317,881 B1 | 11/2001 | Shah-Nazaroff et al. |
| 6,341,374 B2 | 1/2002 | Schein et al. |
| 6,359,580 B1 | 3/2002 | Morrison |
| 6,424,791 B1 | 7/2002 | Saib |
| 6,446,261 B1 | 9/2002 | Rosser |
| 6,483,987 B1 | 11/2002 | Goldschmidt et al. |
| 6,519,770 B2 | 2/2003 | Ford |
| 6,594,825 B1 | 7/2003 | Goldschmidt et al. |
| 6,698,020 B1 | 2/2004 | Zigmond et al. |
| 6,701,527 B2 * | 3/2004 | Schein et al. ................. 725/43 |
| 2002/0080160 A1 | 6/2002 | Devito et al. |
| 2002/0108110 A1 | 8/2002 | Wugofski |
| 2006/0168620 A1 | 7/2006 | Schein et al. |

FOREIGN PATENT DOCUMENTS

| | | | |
|---|---|---|---|
| WO | WO 95 12283 A | 5/1995 | |

OTHER PUBLICATIONS

EP Supplementary Search Report, EP 99 97 1613, Nov. 7, 2002, 4 pages.

* cited by examiner

| 402 | 404 | 406 | 408 | 410 | 412 | 414 {PROGRAM CHARACTERISTIC (1) | ... | PROGRAM CHARACTERISTIC (n)} |
|---|---|---|---|---|---|---|---|---|
| SOURCE IDENTIFIER | CHANNEL TRANSPORT MEDIUM | CHANNEL AUDIO SUPPORT | DATE | START TIME | PROGRAM DESCRIPTION | PROGRAM CHARACTERISTIC (1) | ... | PROGRAM CHARACTERISTIC (n) |
| 7 | ANALOG BROADCAST | STEREO | | | | | | |
| 401 | DIGITAL CABLE | DOLBY PRO LOGIC | | | | | | |
| DISK(1) | DVD | THX; DOLBY AC3 | | | | | | |
| ..... | | | | | | | | |

*FIG. 4*

METHOD AND APPARATUS FOR DISPLAYING DIFFERENCES IN THE CHARACTERISTICS OF MULTIPLE VERSIONS OF AN ENTERTAINMENT PROGRAM

CROSS-REFERENCE TO RELATED APPLICATIONS

The present application is a division of prior application Ser. No. 09/183,277, filed Oct. 30, 1998, the priority of which is hereby claimed.

BACKGROUND OF THE INVENTION

1. Field of the Invention

The present invention pertains to the field of entertainment systems. More particularly, this invention relates to selecting from multiple versions of a television program for display in an entertainment system.

2. Background

A recent trend in the electronics and computer industry is the convergence of computer systems and more traditional entertainment system components. Such convergence allows an increasingly broad range of information to be made available for system users over and above the broadcast television programming which has long been provided via conventional televisions. Accompanying this convergence is the expansion of television programming transport media (e.g., the mechanism or "pipe" via which the programming is transported to the television). While analog broadcasts and analog cable were once the standard transport media for television programming, digital cable and digital satellite systems are becoming more and more commonplace. Additionally, other transport media, such as digital broadcasts, are starting to appear as options for viewers.

Using different transport media has increased the number of sources from which television programming can be received, and thus has also increased the number of television programs available for viewing. These increases are due to both the increase in number of transport media, as well as the additional bandwidth capabilities of some of the newer types of transport media. Additionally, other "local" sources (e.g., video cassette recorders) can also supply programming, thereby further increasing the programming options available to users.

One problem facing users with these increased television programming options is the possibility for the receipt of multiple versions of essentially the same program from multiple sources. For example, two different sources may be broadcasting the same movie at approximately the same time. Differences may exist between these multiple versions and because of these differences a user may prefer to view one over the other. However, given the large selection of television programming options available to the user, locating such different versions can be difficult. Furthermore, the ability for the user to know which version he or she prefers is often difficult, as these differences are typically not made available to the user.

Therefore, a need exists for an improved way to select from multiple versions of a television program.

SUMMARY OF THE INVENTION

A method and apparatus for selecting from multiple versions of a television program is described herein. According to one aspect of the present invention, a computerized method includes identifying multiple versions of a television program that are available from one or more different sources, and displaying a selected one of the multiple versions of the television program.

According to one aspect of the present invention, an article includes a storage medium, the storage medium having stored thereon a plurality of instructions that, when executed by a processor, result in identifying multiple versions of a television program that are available from one or more different sources, and displaying a selected one of the multiple versions of the television program.

According to one aspect of the present invention, an apparatus includes a selection controller to identify multiple versions of a television program that are available from one or more different sources, and a device controller, coupled to the selection controller, to display a selected one of the multiple versions of the television program.

BRIEF DESCRIPTION OF THE DRAWINGS

The present invention is illustrated by way of example and not limitation in the figures of the accompanying drawings, in which like references indicate similar elements and in which:

FIG. 4 illustrates the information stored in an electronic programming guide according to one embodiment of the present invention.

DETAILED DESCRIPTION

In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As is well understood by those skilled in the art, these quantities take the form of electrical, magnetic, or optical signals capable of being stored, transferred, combined, and otherwise manipulated through mechanical and electrical components of the computer system; and the term computer system includes general purpose as well as special purpose data processing machines, systems, and the like, that are standalone, adjunct or embedded.

Additionally, various operations will be described as multiple discrete steps in turn in a manner that is helpful in understanding the present invention. However, the order of description should not be construed as to imply that these operations are necessarily order dependent, in particular, the order of their presentations.

The present invention provides a method and apparatus for selecting from multiple versions of a television program. Different versions of a television program may be available to a user, and each version may have different characteristics, such as being in different languages, viewing formats, etc. The present invention identifies different versions of a program and selects, either automatically or in response to user input, one of the multiple versions for display.

As used herein, a "program" or "television program" refers to a video stream intended to be displayed on a television or other display device. The video stream may also include audio signals to be played in conjunction with the video, and may also include various other information (closed captioning data, etc.). A "version" of a program refers to a particular transmission of the program, having particular characteristics, provided from a source(s). Different versions of a program can have different characteristics, including different video quality, audio quality, etc. Examples of programs include movies, television sitcoms, etc. Examples of different versions of a program include a movie transmitted in letterbox format, the same movie transmitted in standard television format, the same movie transmitted in "director's cut" version, etc.

Figure 1:
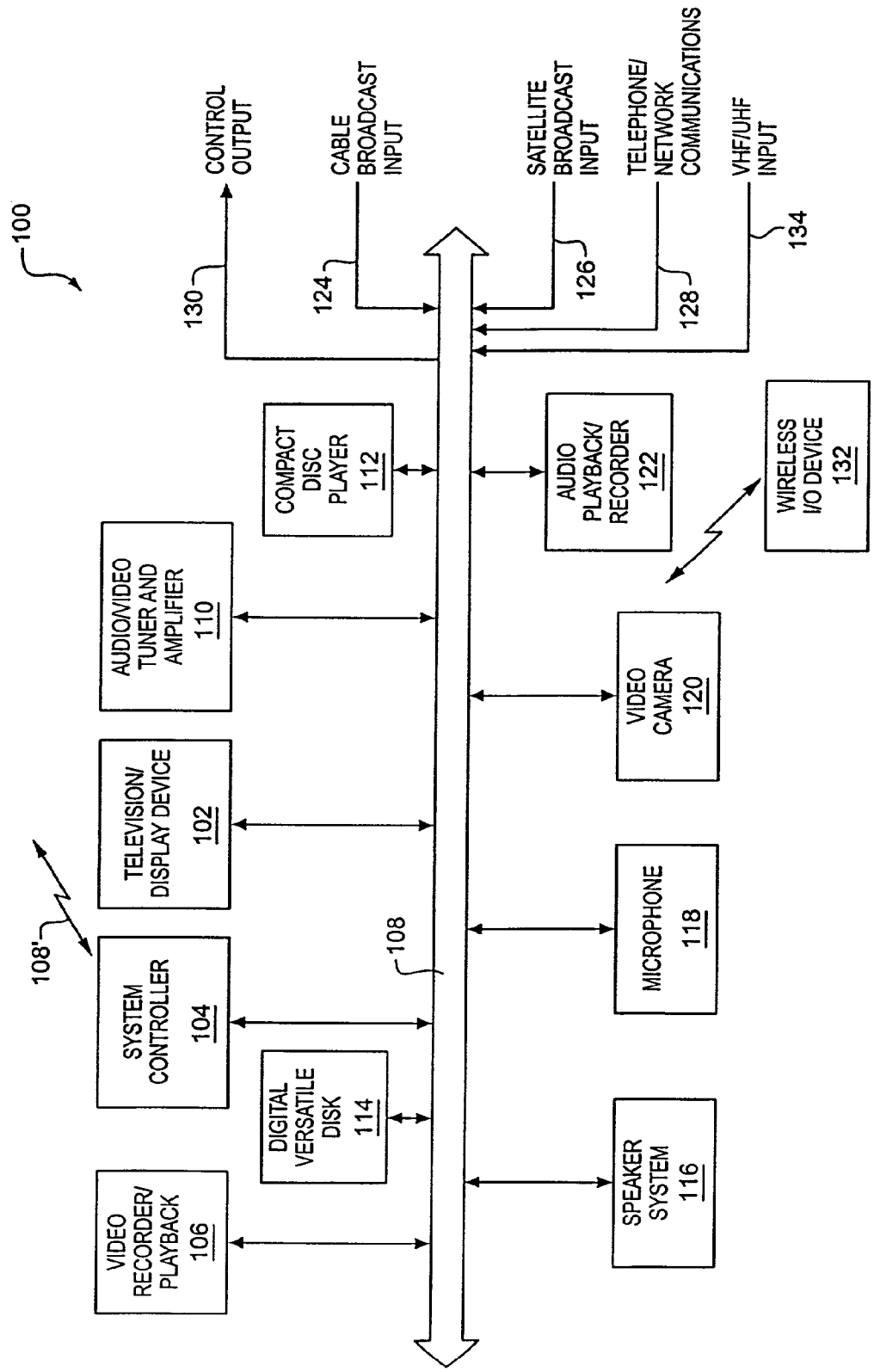
FIG. 1 is a block diagram illustrating the system components of an exemplary entertainment system in which one embodiment of the present invention may be practiced.

FIG. 1 is a block diagram illustrating the system components of an exemplary entertainment system in which one embodiment of the present invention may be practiced. System 100 includes television/display device 102, video recorder/playback device 106, digital video disk (DVD, also referred to as digital versatile disk) recorder/playback device 114, audio/video tuner and/or amplifier 110, audio playback/recorder device 122, and compact disc (CD) player 112, all coupled to a common input/output (I/O) bus 108. It is to be appreciated that the use of the common I/O bus 108 is for ease of explanation in the diagram only, and that a number of alternative means of routing input and output signals may be beneficially employed. For example, audio input and output could be routed with an appropriate number of independent audio "patch" cables, video signals may be routed with independent coaxial cables, and control signals may be routed along a two-wire serial line, or through infrared (IR) communication signals or radio frequency (RF) communication signals. By way of further example, audio, video, and/or control signals may also be routed along one or more buses in accordance with the Universal Serial Bus Specification, Revision 1.0 (Jan. 15, 1996), or the High Performance Serial Bus IEEE Standard 1394, IEEE std. 1394–1995, draft 8.0v3, approved Dec. 12, 1995.

In addition, system 100 includes speaker system 116, microphone 118, video camera 120 and a wireless input/output control device 132. In one embodiment, wireless I/O control device 132 is an entertainment system remote control unit which communicates with the components of system 100 through IR signals. In another embodiment, wireless I/O control device 132 may be a wireless keyboard and/or cursor control device that communicates with the components of system 100 through IR signals or RF signals. In yet another embodiment, wireless I/O control device 132 may be an IR or RF remote control device similar in appearance to a typical entertainment system remote control with the added feature of a track-ball or other cursor control mechanism that allows a user to position a cursor on a display of system 100.

At the core of system 100 is system controller 104 incorporated with the features of the present invention, configured to control a variety of features associated with the system components. As depicted, system controller 104 is coupled to each of the system components, as necessary, through I/O bus 108. In one embodiment, in addition to or in place of I/O bus 108, system controller 104 may be configured with a wireless communications transmitter (or transceiver), which is capable of communicating with the system components via IR signals or RF signals 108'. Regardless of the control medium, system controller 104 is configured to control each of the entertainment system components of system 100, although it is understood that each of the components may be individually controlled with wireless I/O device 132.

System controller 104 retrieves and stores entertainment programming information available from a wide variety of sources. During operation of system 100, system controller 104 dynamically configures the operating parameters of system 100 and offers additional value added features to enhance the user's enjoyment of system 100, as discussed in more detail below. In one embodiment, system controller 104 may be a computer system incorporated with the teachings of the present invention, as will be discussed in further detail below. In another embodiment, system controller 104 may be a "set-top" box endowed with the necessary processing power and incorporated with the teachings of the present invention. Regardless of the particular embodiment, system controller 104 may also be referred to as a "convergence system" designed to integrate the world of entertainment systems and computing platforms to achieve the beneficial results discussed in greater detail below.

Although the present invention is described in the context of the exemplary embodiments presented in the figures, based on the descriptions to follow, those skilled in the art will appreciate that the present invention is not limited to these embodiments and may be practiced in a variety of alternate embodiments. Accordingly, the innovative features of the present invention may be practiced in a system of greater or lesser complexity than that of the system depicted in FIG. 1. By way of example, devices may be added to system 100, or devices (e.g., video camera 120, microphone 118, DVD recorder/playback device 114, etc.) may be removed from system 100.

As illustrated in FIG. 1, system 100 can be configured to receive audio/video programming input via a wide variety of transport media. In one embodiment, system 100 receives programming input via any or all of the following transport media: cable broadcast 124, satellite broadcast 126 (e.g., via a satellite dish), very high frequency (VHF) or ultra high frequency (UHF) radio frequency communication of the broadcast networks 134 (e.g., via an aerial antenna), and/or the telephone/computer network interface 128. Further, it will be appreciated by those skilled in the art that cable broadcast input 124, satellite broadcast input 126 and VHF/UHF input 134 may include analog and/or digital programming (e.g., digital high definition television (HDTV) programming). Additionally, audio/video programming may be received from a CD-ROM, DVD, or other digital or analog storage device via a playback device of system 100 (e.g., DVD recorder/playback device 114). The Internet, an entertainment network, or other network may also provide audio/video programming, via, for example, interface 128.

In addition to programming input, system 1100 is also configured with a number of general purpose control outputs 130 which may be configured to control any number of devices. In one embodiment, for example, as system controller 104 configures system 100 to display a movie, it may also dim the lights in the room to a predetermined level to further enhance the viewing environment. Control circuitry which allows a computing device to control, for example, lighting, thermostat settings, and other household appliances (via, for example, the electrical wiring in a house) are well known in the art and thus will not be described further.

Except for the incorporated teachings of the present invention (to be more fully described below), system controller 104 is intended to represent a broad category of computing devices known in the art. An example of such a computing device is a desktop computer system equipped with a high performance microprocessor(s), such as the Pentium® processor, Pentium® Pro processor, or Pentium® II processor manufactured by and commonly available from Intel Corporation of Santa Clara, Calif. Another example of such a computing device is an Internet "appliance" device, such as a WebTV™ Internet Terminal available from Sony Electronics Inc. of Park Ridge, N.J., or Philips Consumer Electronics Company of Knoxville, Tenn. It is to be appreciated that the housing size and design for system controller 104 may be altered, allowing it to better visually fit into system 100.

It is also to be appreciated that the several entertainment system components depicted in FIG. 1 can be beneficially combined. By way of example, system controller 104 could be integrated into television/display device 102, DVD recorder/playback device 114, or audio/video tuner and amplifier 110.

Figure 2:
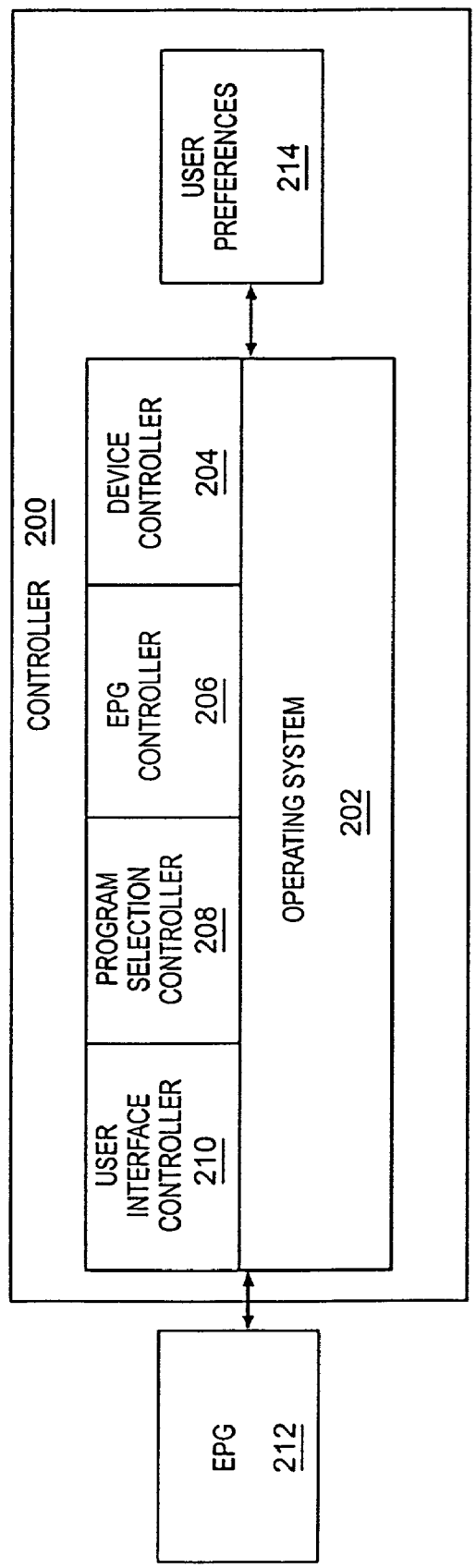
FIG. 2 is a block diagram illustrating the architecture of a system controller according to one embodiment of the present invention.

FIG. 2 is a block diagram illustrating the architecture of a system controller according to one embodiment of the present invention. According to one implementation, system controller 104 of FIG. 1 is a system controller 200 of FIG. 2. As illustrated, system controller 200 includes operating system 202, device controller 204, electronic programming guide (EPG) controller 206, program selection controller 208, and user interface (UI) controller 210. Operating system 202 represents any of a wide variety of conventional operating systems (such as the Windows™ 95 or Windows™ 98 operating systems available from Microsoft Corporation of Redmond, Wash.), and operates to allow the controllers 204–210 to communicate with one another. Additionally, communication with other components within an entertainment system can also be provided by operating system 202, such as with the components illustrated in FIG. 1.

Device controller 204 controls the various components within the entertainment system, such as those illustrated in FIG. 1. Commands to change the various parameters of the components, such as channel selection or volume control, are sent to those components from device controller 204.

EPG controller 206 controls access to electronic programming guide (EPG) 212. EPG 212 is typically stored on a storage device within the entertainment system (such as a magnetic or optical disk), with selected portions being temporarily stored in system memory (such as random access memory). EPG controller 206 accesses EPG 212 and displays requested EPG data on a display device (e.g., device 102 of FIG. 1). EPG controller 206 services requests for information from the EPG from other components of controller 200, such as UI controller 210 and program selection controller 208.

Program selection controller 208 receives inputs from UI controller 210 regarding programs being displayed, as well as selections, if any, made by a user of the entertainment system. Program selection controller 208 accesses EPG 212 via EPG controller 206 to identify multiple versions of programs. Program selection controller 208 also selects which of multiple versions is to be displayed to the user. The selection from multiple versions of a program is discussed in more detail below.

According to one embodiment of the present invention, system controller 200 also includes user preferences 214. User preferences 214 identify preferred viewing options and/or viewing habits of the user(s) of the entertainment system. This preference information can be manually input to the system by the user(s), or alternatively can be generated by controller 200 based on monitored viewing behavior, or alternatively can be provided by another device (e.g., from a remote server). According to one implementation, program selection controller 208 utilizes user preferences 214 in selecting from multiple versions of a program, as discussed in more detail below.

According to one embodiment of the present invention, different users having different user preferences can use the system. Thus, in this embodiment, if the system is automatically selecting one of the multiple versions of program, then the system identifies the particular user prior to selecting one of the different versions in order to know the proper user preferences for comparison to program version characteristics. Identification of a particular user can be made in any of a variety of conventional manners, such as by a user id log-in process, voice recognition, etc. Alternatively, separate user preferences may not be maintained by the system. In this alternate embodiment a single global user preference is used for all system users when automatic selection is employed.

Figure 3:
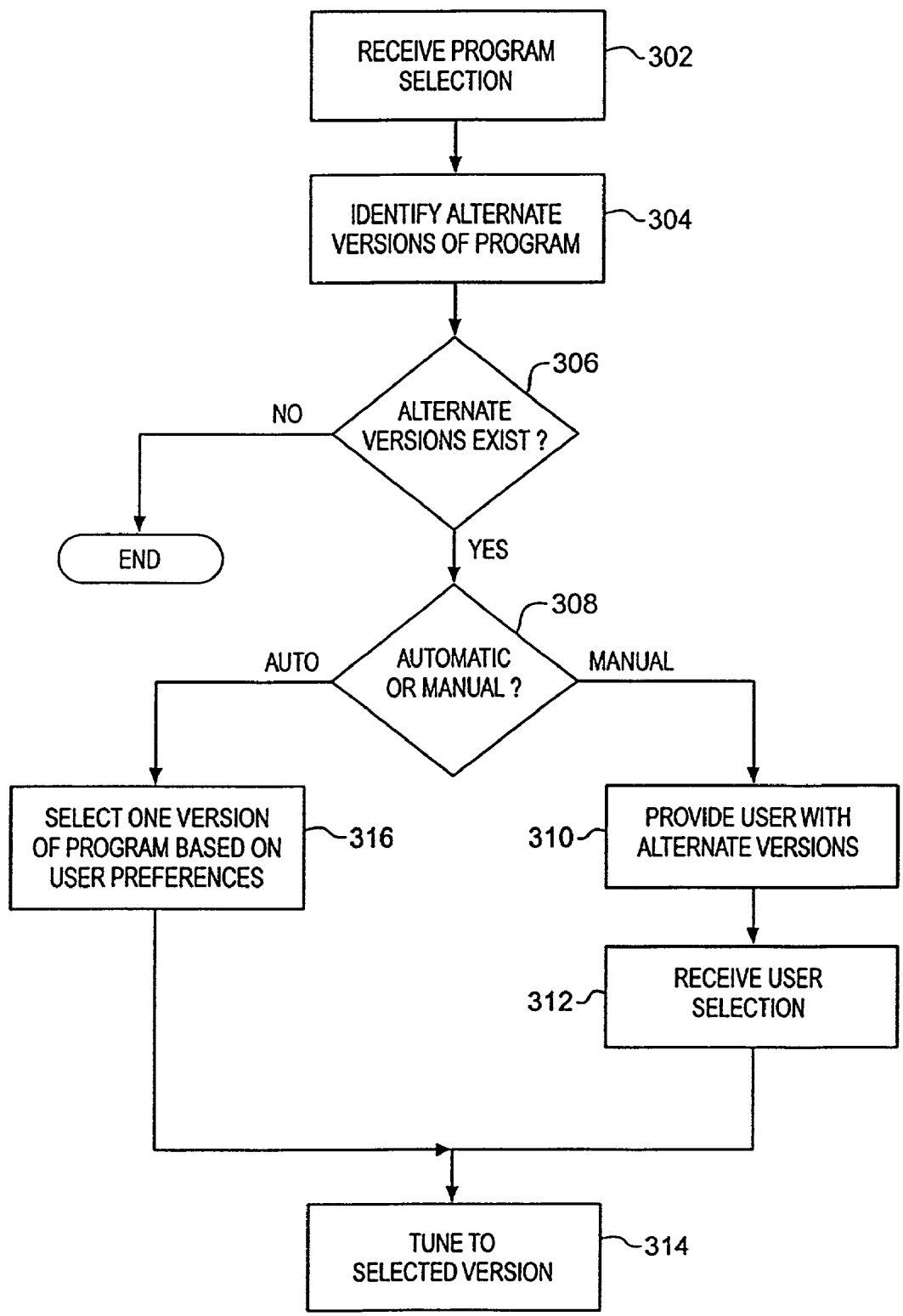
FIG. 3 is a flowchart illustrating the process of selecting from multiple versions of a program according to one embodiment of the present invention.

FIG. 3 is a flowchart illustrating the process of selecting from multiple versions of a program according to one embodiment of the present invention. An initial program selection is received by program selection controller 208 of FIG. 2 (for example, via user interface controller 210), step 302. This selection can be made in any of a wide variety of conventional manners, such as selection of a particular program from an EPG displayed on-screen. Selections could also be made in alternate manners, such as by input of a particular numerical channel, or selection of a channel control option (e.g., up or down arrows on a remote control device).

When a program selection is made, program selection controller 208 identifies alternate versions, if any, of the selected program, step 304. This identification process is carried out by accessing EPG 212 of FIG. 2. Program selection controller 208 searches through the data of EPG 212 for different versions of the program that start within a threshold period of time of the start of the version corresponding to the original program selection. Typically, this threshold period of time is zero. However, in alternate implementations the period of time can range from zero (indicating the versions have the same start time) up to a maximum (e.g., five minutes) that can be user-definable. According to one implementation, different versions of a program are identified by searching EPG 212 for additional entries having the same identifier (e.g., movie title, sitcom name and episode number, etc.). It should be noted that the alternate versions of a program may be from different sources, or multiple versions may be available from the same source.

Upon completing the search of EPG 212, program selection controller 208 checks whether any alternate versions were identified, step 306. If no alternate versions were identified, then the process ends. However, if alternate versions were identified, then the operation of program selection controller 208 depends on whether controller 208 is configured to perform automatic or manual selection of alternate versions, step 308. According to one implementation, this configuration is user-definable. Alternatively, program selection controller 208 may be pre-configured to provide only manual or automatic selection.

If program selection controller 208 is configured to perform manual selection, then program selection controller 208 provides the user with the alternate versions, step 310. This provision can be in any of a wide variety of manners, such as displaying the options in a separate box or window on the display device, overlaying the current video display with the options, etc. Additionally, in one implementation, program selection controller 208 displays all the characteristics for each version to allow the user to make an informed decision as to which version is preferred. Alternatively, program selection controller 208 identifies the differences in characteristics between the different versions and hi-lights, or only displays, those differences.

Program selection controller 208 then waits to receive a user selection of one of the versions, step 312. System controller 200 then "tunes" to the appropriate source and/or channel for the selected version, step 314. It is to be appreciated that this source and/or channel can be from any of multiple components or sources, such as those illustrated in FIG. 1.

Returning to step 308, if program selection controller 208 is configured to perform automatic selection, then program selection controller 208 automatically selects one of the versions based on user preferences 214, step 316. Program selection controller 208 compares the characteristics of each of the multiple versions of the program to the user preferences 214. The version having the most characteristics that conform to the user preferences 214 is then selected. System controller 200 then "tunes" to the appropriate source and/or channel for the selected version, step 314.

FIG. 4 illustrates the information stored in an electronic programming guide according to one embodiment of the present invention. In the illustrated embodiment, the EPG includes information regarding all programs that are available to the entertainment system. For ease of explanation, the information in the EPG is illustrated as table 400. However, it is to be appreciated that the information can be stored in any of a variety of conventional manners using any of a wide variety of data storage structures, such as one or more linked lists, one or more arrays, etc.

Each entry in table 400 includes various descriptive information regarding a particular program. This information includes a source identifier 402, channel transport medium 404, channel audio support 406, date 408, start time 410, program description 412, and multiple (n) program characteristics 414.

Source identifier 402 identifies the source of the program. This source can be a particular channel that can be tuned to (e.g., analog or digital broadcasts channels, cable channels, satellite broadcast channels, etc.), as well as other sources within the entertainment system that can provide programs (e.g., DVDs, video cassettes, web server addresses (such as servers on the Internet), etc.). Programs from such other devices would include, for example, movies on DVD or cassette that have been purchased or rented by a user and thus are available for the user's viewing. When a particular program is selected for viewing by a user, system controller 104 of FIG. 1 activates and "tunes" the appropriate devices, as necessary, for the identified source to be displayed on display device 102.

Channel transport medium 404 identifies the transport medium used by the source. Examples of such transport media include, but are not limited to, analog broadcast, digital broadcast, analog cable, digital cable, satellite, network (e.g., the Internet), digital video disk, and analog video cassette.

Channel audio support 406 identifies the types of audio that are supported by the source. Examples of such audio types include, but are not limited to, mono, stereo, Dolby™ Surround, Dolby™ Digital, Dolby™ Surround Pro Logic, Dolby™ AC3 Stereo, and THX™. It should be noted that the audio types supported by the source do not necessarily indicate the audio type used for a particular program. For example, a program may be broadcast in stereo even though the source support Dolby AC3™.

Date 408 identifies the date on which the program is available. Similarly, start time 410 identifies the time on that date at which the program begins. It should be noted that, depending on the source, different "wild cards" for date and start time can be used. For example, if the source is a video on demand source then the program may be available at any start time over a particular date period (e.g., during a particular month). By way of another example, if the source is DVD, then the program may be available at any time on any date.

Program description 412 provides a brief description of the program. This description can include information such as title, summary, actors/actresses, etc. Such information can be displayed to a user upon request.

Program characteristics 414 are multiple (n) characteristics regarding the program. The same or different characteristics may be stored for each of the different programs. These characteristics 414 can be used in determining which of multiple versions of a program is to be displayed to a user as discussed above. Examples of program characteristics that may be stored for each of the different programs include, but are not limited to: program duration (the program duration can be compared with the actual broadcast time for the program in order to determine the amount of commercial or pledge-break time inserted into the program), the availability of alternate audio (e.g., second audio program (SAP)), type of audio support for the program (e.g., mono, stereo, Dolby™ Surround, Dolby™ Digital, Dolby™ Surround Pro Logic, Dolby™ AC3 Stereo, and THX™), availability of enhanced programming (such as by the vertical blanking interval or digital simulcast, such as Intercast™ programming or Microsoft ETV), program rating (e.g., TVG, TV14, TVMA, etc.), language of subtitles, language of dubbing, language spoken in the program, screen format (e.g., standard TV or letterbox), whether the program is a director's cut version, availability of descriptive video service (e.g., a descriptive narration for sight-impaired viewers), availability of closed captioning, and color code (e.g., black and white, color, colorized).

Any of the information stored in the electronic programming guide can be used as a basis for distinguishing between different versions of a program. For example, particular audio quality levels or viewing formats (e.g., letterbox) may be preferred by a particular user. By way of another example, programs with fewer or no commercials (that is, those with shorter durations), or programs in a particular language may be preferred by a particular user. By way of yet another example, programs from particular sources, such as "free" broadcasts versus video on demand or a particular local broadcast channel may be preferred by a particular user.

Figure 5:
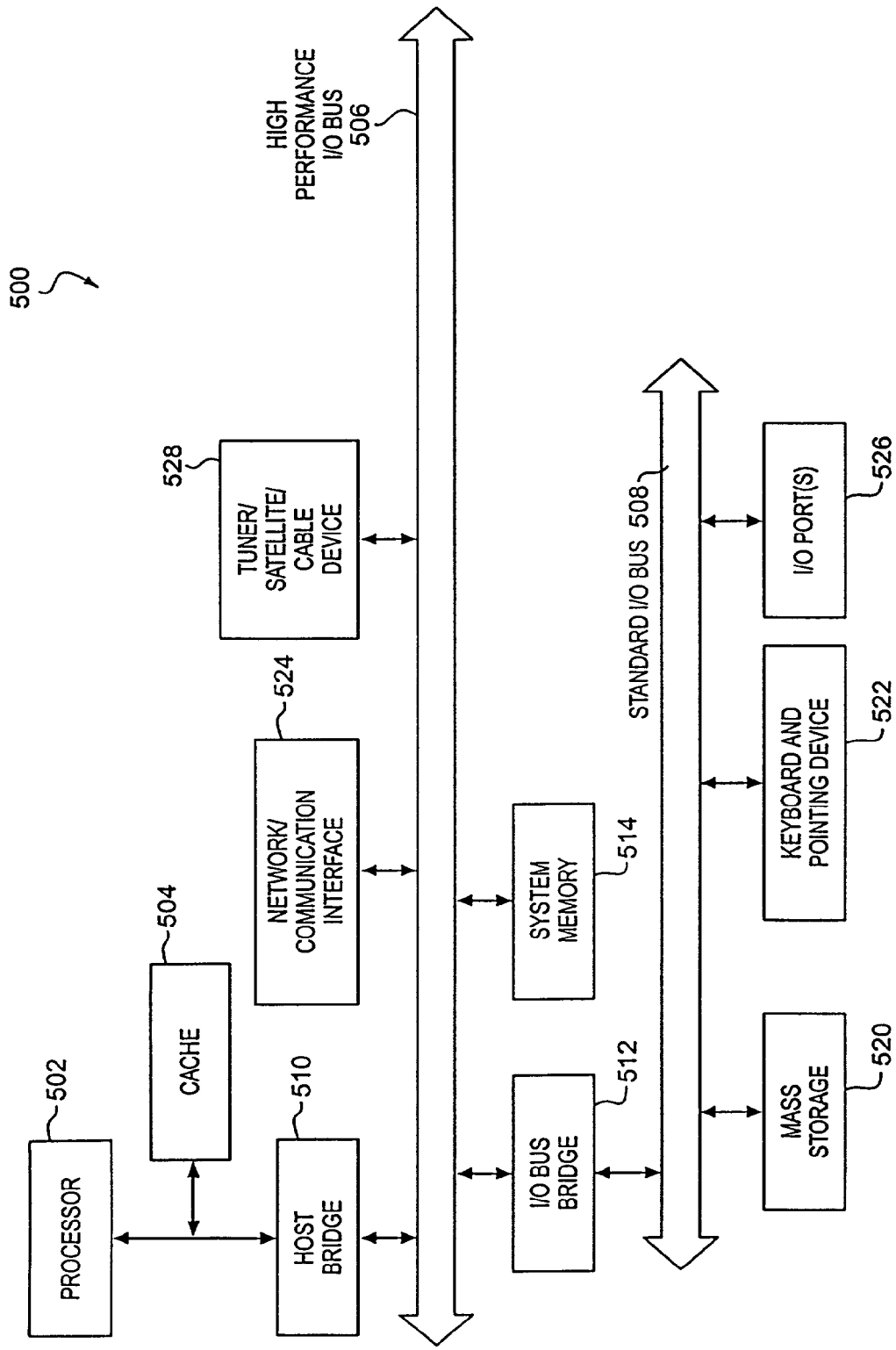
FIG. 5 illustrates one embodiment of a computing device suitable for use with the present invention.

FIG. 5 illustrates one embodiment of a computing device suitable for use with the present invention. According to one implementation, system controller 104 of FIG. 1 is a computing device 500 of FIG. 5. In the illustrated embodiment of FIG. 5, device 500 includes processor 502 and cache memory 504 coupled to each other as shown. Additionally, device 500 includes high performance input/output (I/O) bus 506 and standard I/O bus 508. Host bridge 510 couples processor 502 to high performance I/O bus 506, whereas I/O bus bridge 512 couples the two buses 506 and 508 to each other. Coupled to bus 506 are network/communication interface 524 and system memory 514. Coupled to bus 508 is mass storage 520, keyboard and pointing device 522, and I/O ports 526. Collectively, these elements are intended to represent a broad category of hardware systems, including but not limited to general purpose computer systems based on the Pentium® processor, Pentium® Pro processor, or Pentium® II processor, manufactured by Intel Corporation of Santa Clara, Calif.

In one embodiment, various electronic devices are also coupled to high performance I/O bus 506. As illustrated, analog tuner/digital satellite/cable devices 528, are also coupled to high performance I/O bus 506 to allow device 500 to "tune" to various programming input channels.

These elements 502-528 perform their conventional functions known in the art. In particular, network/communication interface 524 is used to provide communication between device 500 and any of a wide range of conventional networks, such as an Ethernet, token ring, the Internet, etc. It is to be appreciated that the circuitry of interface 524 is dependent on the type of network the device 500 is being coupled to.

Mass storage 520 is used to provide permanent storage for the data and programming instructions to implement the above described functions, whereas system memory 514 is used to provide temporary storage for the data and programming instructions when executed by processor 502. I/O ports 526 are one or more serial and/or parallel communication ports used to provide communication between additional peripheral devices which may be coupled to device 500.

It is to be appreciated that various components of device 500 may be re-arranged. For example, cache 504 may be on-chip with processor 502. Alternatively, cache 504 and processor 502 may be packaged together as a "processor module", with processor 502 being referred to as the "processor core". Furthermore, certain implementations of the present invention may not require nor include all of the above components. For example, mass storage 520, keyboard and pointing device 522, and/or network/communication interface 524 may not be included in device 500. Additionally, the peripheral devices shown coupled to standard I/O bus 508 may be coupled to high performance I/O bus 506; in addition, in some implementations only a single bus may exist with the components of device 500 being coupled to the single bus. Furthermore, additional components may be included in device 500, such as additional processors, storage devices, or memories.

In one embodiment, the method and apparatus for selecting from multiple versions of a television program according to the present invention as discussed above is implemented as a series of software routines run by device 500 of FIG. 5. In this embodiment, controllers 204-210 of FIG. 2 are each implemented as a series of software routines. These software routines comprise a plurality or series of instructions to be executed by a processor in a hardware system, such as processor 502 of FIG. 5. Initially, the series of instructions are stored on a storage device, such as mass storage 520. It is to be appreciated that the series of instructions can be stored using any conventional storage medium, such as a diskette, CD-ROM, magnetic tape, DVD, laser disk, ROM, Flash memory, etc. It is also to be appreciated that the series of instructions need not be stored locally, and could be received from a remote storage device, such as a server on a network, via network/communication interface 524. The instructions are copied from the storage device, such as mass storage 520, into memory 514 and then accessed and executed by processor 502. In one implementation, these software routines are written in the C++ programming language. It is to be appreciated, however, that these routines may be implemented in any of a wide variety of programming languages.

In alternate embodiments, the present invention is implemented in discrete hardware or firmware. For example, one or more application specific integrated circuits (ASICs) could be programmed with the above described functions of the present invention. By way of another example, controllers 204-210 of FIG. 2 could be implemented in one or more ASICs of an additional circuit board for insertion into hardware system 500 of FIG. 5.

In the discussions above, reference is made to multiple version options being displayed to a user after all version options have been identified by program selection controller 208 of FIG. 2. According to alternate embodiments, different methodologies may be used in displaying version options to a user. According to one such alternate embodiment, indications of different versions are displayed to a user as the versions are identified. According to another embodiment, as soon as an exact match between user preferences and program version characteristics is made, the matching program is displayed to the user (no further searching need be performed).

Thus, it can be seen that the method and apparatus of the present invention advantageously identifies multiple versions of a television program and provides one of those versions for display. The present invention can advantageously locate other versions of a program from a wide variety of sources that more closely conform to the user's preferences, and thus make the user's viewing of the program more enjoyable.

Thus, a method and apparatus for selecting from multiple versions of a television program has been described. Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

What is claimed is:

1. A method comprising:
   receiving entertainment programming input;
   identifying multiple versions of an available entertainment program;
   identifying, for each of the multiple versions, a set of descriptive information regarding the respective version, the descriptive information comprising a plurality of video and audio quality characteristics of the respective version;
   identifying the differences in characteristics between the multiple versions; and
   displaying characteristics of the identified multiple versions and highlighting the differences in characteristics between the multiple versions to a user.

2. The method of claim 1, wherein highlighting the differences comprises displaying only the identified differences in characteristics.

3. The method of claim 1, wherein the characteristics further comprise at least one of a source identifier, a channel transport medium, program duration, pricing, enhanced programming availability, closed captioning availability, language of subtitles in the version and language spoken in the version.

4. The method of claim 1, further comprising:
receiving a selection from the user identifying one of the plurality of the multiple versions; and
displaying the multiple version corresponding to the user selection.

5. The method of claim 1, wherein the multiple versions are available using different channel transport media the method further comprising displaying an identification of the channel transport medium for each respective version.

6. The method of claim 1, wherein the channel transport media include one or more of cable broadcast, satellite broadcast, radio frequency broadcast, telephone interface, computer network interface, CD-ROM, video disk, and video cassette.

7. The method of claim 1, wherein identifying multiple versions comprises searching through data of an electronic programming guide.

8. The method of claim 1, wherein the video quality characteristics comprise at least one of letterbox format, standard television format and director's cut version.

9. The method of claim 1, wherein the audio quality characteristics comprise at least one of mono, stereo, surround, digital stereo and digital surround.

10. A computer-readable medium having stored thereon a plurality of computer-readable instructions that, when executed by a computer result in:
receiving entertainment programming input;
identifying multiple versions of an available entertainment program;
identifying, for each of the multiple versions, a set of descriptive information regarding the respective version, the descriptive information comprising a plurality of video and audio quality characteristics of the respective version;
identifying the differences in characteristics between the multiple versions; and
displaying characteristics of the identified multiple versions and highlighting the differences in characteristics between the multiple versions to a user.

11. The computer-readable medium of claim 9, wherein the plurality of instructions which when executed by the processor, result in highlighting the differences, further result in displaying only the identified differences in characteristics.

12. The computer-readable medium of claim 10, wherein the characteristics further comprise at least one of a source identifier, a channel transport medium, program duration, pricing, enhanced programming availability, closed captioning availability, language of subtitles in the version and language spoken in the version.

13. The computer-readable medium of claim 10, wherein the plurality of instructions, when executed by the processor, further result in receiving a selection from the user identifying one of the multiple versions, and displaying the multiple version corresponding to the user selection.

14. The computer-readable medium of claim 10, wherein the multiple versions are available using different channel transport media and wherein the plurality of instructions, when executed by the processor, further result in displaying an identification of the channel transport medium for each respective version.

15. The computer-readable medium of claim 10, wherein the channel transport media include one or more of cable broadcast, satellite broadcast, radio frequency broadcast, telephone interface, computer network interface, CD-ROM, video disk, and video cassette.

16. The computer-readable medium of claim 10, wherein the plurality of instructions, which when executed by the processor, result in identifying multiple versions comprise searching through data of an electronic programming guide.

17. An apparatus comprising:
a program guide controller to receive entertainment programming input;
a selection controller coupled to the program guide controller to identify multiple available versions of an entertainment program, to identify, for each of the multiple versions, a set of descriptive information regarding the respective version, the descriptive information comprising a plurality of video and audio quality characteristics of the respective version and to identify the differences in characteristics between the multiple versions; and
a device controller, coupled to the selection controller, to display characteristics of the multiple versions and to highlight the differences in characteristics between the multiple versions to a user.

18. The apparatus of claim 17, wherein the device controller in highlighting the differences is to display only the identified differences in characteristics.

19. The apparatus of claim 17, wherein the characteristics further comprise at least one of a source identifier, a channel transport medium, program duration, pricing, enhanced programming availability, closed captioning availability, language of subtitles in the version and language spoken in the version.

20. The apparatus of claim 17, further comprising a user interface controller to receive a selection from the user identifying one of the plurality of the multiple versions; and wherein the device controller is further to display the multiple version corresponding to the user selection.

21. The apparatus of claim 17, wherein the multiple versions are available using different channel transport media and wherein the device controller is further to display an identification of the channel transport medium for each respective version.

22. The apparatus of claim 17, wherein the channel transport media include one or more of cable broadcast, satellite broadcast, radio frequency broadcast, telephone interface, computer network interface, CD-ROM, video disk, and video cassette.

* * * * *

UNITED STATES PATENT AND TRADEMARK OFFICE
CERTIFICATE OF CORRECTION

PATENT NO. : 7,240,356 B2
APPLICATION NO. : 09/779778
DATED : July 3, 2007
INVENTOR(S) : Iki et al.

It is certified that error appears in the above-identified patent and that said Letters Patent is hereby corrected as shown below:

In column 4, at line 63, delete "1100" and insert --100--.

In column 11, at line 46, delete "9" and insert --10--.

Signed and Sealed this

Fifteenth Day of April, 2008

JON W. DUDAS
*Director of the United States Patent and Trademark Office*